US007976961B2

(12) United States Patent
Yoshida et al.

(10) Patent No.: US 7,976,961 B2
(45) Date of Patent: Jul. 12, 2011

(54) LAMINATE OF MAGNETIC SUBSTRATES AND METHOD OF MANUFACTURING THE SAME

(75) Inventors: Mitsunobu Yoshida, Sodegaura (JP); Nobuhiro Maruko, Sodegaura (JP); Hiroshi Watanabe, Sodegaura (JP)

(73) Assignee: Nakagawa Special Steel Co., Ltd., Chuo-Ku, Tokyo (JP)

( * ) Notice: Subject to any disclaimer, the term of this patent is extended or adjusted under 35 U.S.C. 154(b) by 268 days.

(21) Appl. No.: 10/573,707

(22) PCT Filed: Sep. 27, 2004

(86) PCT No.: PCT/JP2004/014084

§ 371 (c)(1), (2), (4) Date: Mar. 27, 2006

(87) PCT Pub. No.: WO2005/031767

PCT Pub. Date: Apr. 7, 2005

(65) Prior Publication Data

US 2007/0141399 A1 Jun. 21, 2007

(30) Foreign Application Priority Data

Sep. 26, 2003 (JP) ................................ 2003-336589

(51) Int. Cl.
*B32B 15/04* (2006.01)

(52) U.S. Cl. ................................ 428/693.1; 428/692.1

(58) Field of Classification Search ............... 428/846.6, 428/847, 847.1

See application file for complete search history.

(56) References Cited

U.S. PATENT DOCUMENTS

| | | | | |
|---|---|---|---|---|
| 4,201,837 | A * | 5/1980 | Lupinski | 428/457 |
| 4,565,746 | A * | 1/1986 | Hayase | 428/638 |
| 4,608,297 | A * | 8/1986 | Shimada et al. | 428/811.3 |
| 4,705,578 | A * | 11/1987 | Lin et al. | 148/108 |
| 4,849,618 | A * | 7/1989 | Namikawa et al. | 235/493 |
| 4,904,527 | A * | 2/1990 | Nolle et al. | 428/334 |
| 4,960,651 | A * | 10/1990 | Pettigrew et al. | 428/607 |
| 5,240,541 | A * | 8/1993 | Lin et al. | 156/270 |
| 6,468,678 | B1 * | 10/2002 | Dahlin et al. | 428/800 |
| 7,106,163 | B2 * | 9/2006 | Jin et al. | 336/233 |
| 2005/0089708 | A1 | 4/2005 | Maruko et al. | |

FOREIGN PATENT DOCUMENTS

| | | | |
|---|---|---|---|
| DE | 3244823 | A1 | 6/1984 |
| JP | 55-47582 | | 12/1980 |
| JP | 58-175654 | A | 10/1983 |
| JP | 04170012 | A * | 6/1992 |
| JP | 2002-260910 | A | 9/2002 |
| JP | 2002260910 | A * | 9/2002 |
| JP | 2003-100523 | A | 4/2003 |
| JP | 2003-110340 | A | 4/2003 |
| WO | 03/060175 | A1 | 7/2003 |

OTHER PUBLICATIONS

Notice of Reasons for Rejection dated Dec. 24, 2008 cited in corresponding Japanese Patent Application No. 2005-514222.
English Translation of Notice of Reasons for Rejection dated Dec. 24, 2008 cited in corresponding Japanese Patent Application No. 2005-514222.
Office Action from German Patent and Trademark Office issue in Applicant's corresponding German Patent Application No. 11 2004 001 813.7-24 dated Jul. 29, 2010, and an English Translation thereof.

* cited by examiner

*Primary Examiner* — Mark Ruthkosky
*Assistant Examiner* — Gary Harris
(74) *Attorney, Agent, or Firm* — Buchanan Ingersoll & Rooney PC

(57) ABSTRACT

A laminate of a magnetic substrate comprising a high molecular compound layer and a magnetic metal thin plate wherein the volume resistivity defined in JIS H 0505 in a direction perpendicular to the high molecular compound layer surface of the laminate is less than $10^8$ Ωcm. The laminate is provided with an electrical continuity point created among magnetic metal thin plates such that the high molecular compound inside the laminate is pushed out to the outside of the laminate by pressurizing the laminate. The laminate can exhibit high thermal conductivity in order to prevent deterioration of heat releasing properties caused by low thermal conductivity when exothermic heat due to the core loss of the laminate of the magnetic substrate is released to the outside.

18 Claims, No Drawings

LAMINATE OF MAGNETIC SUBSTRATES AND METHOD OF MANUFACTURING THE SAME

TECHNICAL FIELD

The present invention relates to a magnetic metal thin plate provided with a high molecular compound, a laminate thereof and a method of manufacturing the laminate.

BACKGROUND ART

Conventionally, when a magnetic metal material is used as a thin plate, it is used by laminating a plurality of single thin plates. To laminate the thin plates, for example, when an amorphous metal ribbon is used as a magnetic metal material, since the thickness of the amorphous metal ribbon is from about 10 to 50 micro-meters, the surface of the amorphous metal ribbon is uniformly coated with a specific adhesive or impregnated in an adhesive and the resulting materials are laminated. Japanese Patent Application Laid-Open (JP-A) No. 1983-175654 (Patent Document 2) discloses a method for manufacturing a laminate wherein amorphous metal ribbons coated with an adhesive comprising as a main component a high heat resistant high molecular compound are stacked, pressed under a mandrel roll and then heat-adhered. However, when laminating the amorphous metal ribbons coated with a resin, only the film thickness is defined, but an adhered state is not specifically described.

Furthermore, in order to suppress eddy current between the magnetic metal thin plates, according to a conventional technique, the magnetic metal thin plates have been coated with a resin to actively achieve electrical insulation. In this manner, the electrical properties of the alternating current between the magnetic metal thin plates have been enhanced. For example, in U.S. Pat. No. 4,201,837 (Patent Document 2) a resin which has been used to improve the electrical properties of the alternating current is described as a preferred embodiment using a high molecular compound; however, this simply signifies insulating between metal layers with the high molecular compound. Further, in International Publication (WO) No. 03/060175 (Patent Document 3), a laminate of magnetic substrates comprising an amorphous metal and a high molecular compound is described. However, there is no specific disclosure regarding problems concerning exothermic property at times of use.

However, in any of these methods, in order to actively achieve electrical insulation, the film thickness of a high molecular compound layer must be increased to suppress the eddy current such that the metal thin plates do not come into contact with one another. In doing so, the proportion of the volume of a magnetic metal in a laminate (stacking factor) is lowered. Further, when a laminate is used for a magnetic core, it generates heat due to core loss. However, since the thermal conductivity of a resin is 10 to 100 times worse than that of a metal, the heat is unfavorably released via the resin layer. As a result, there has been a problem that as the resin layer gets thick, and heat is easily locked up in the laminate. When a magnetic laminate according to a conventional technique is used for a magnetic core, this becomes problematic from the viewpoints of miniaturization and higher power output, due to the rated power being reduced.

Patent Document: 1: JP-A No. 1983-175654A
Patent Document 2: U.S. Pat. No. 4,201,837
Patent Document 3: WO No. 03/060175

DISCLOSURE OF THE INVENTION

Problems to be Solved by the Invention

Considering the use of a magnetic substrate laminated with magnetic metal thin plates and a resin for a magnetic core, the present invention aims to provide a magnetic substrate having low exothermic property by preventing deterioration of the stacking factor of the magnetic metal while performing any necessary insulation between magnetic metal thin plates.

Arts to Solve the Invention

In order to achieve the above object, the present inventors have found that by appropriately controlling the thickness of a resin coated film and a method of lamination, and making the volume resistivity defined in JIS H 0505 to be in the range of from 0.1 to less than $10^8$ Ωcm, heat releasing properties can be improved without lowering the stacking factor. As a result, they have found that miniaturization and high power of applied parts and apparatuses of a magnetic core or the like can be achieved. Thus, the present invention has been completed.

That is, the present invention provides a laminate of magnetic substrates comprising a high molecular compound layer and a magnetic metal thin plate, wherein metals partially contact one another between thin plates and the volume resistivity defined in JIS H 0505 in a direction perpendicular to an adhesive surface of the laminate is from 0.1 to less than $10^8$ Ωcm.

Furthermore, one of the preferred embodiments of the present invention is that the high molecular compound layer covers not less than 50% of the area of an adhesive surface of the magnetic metal thin plate and the volume resistivity defined in JIS H 0505 in a direction perpendicular to the adhesive surface of the laminate is from 1 Ωcm to $10^6$ Ωcm.

Furthermore, two or more kinds of the magnetic metal thin plates may be used as a magnetic metal thin plate for use in the laminate of magnetic substrates of the present invention.

Furthermore, one of the preferred embodiments of the present invention is that the magnetic metal thin plate is made of at least two or more kinds of metals selected from an amorphous metal, a nano crystal magnetic metal or a silicon steel sheet. One of the further preferred embodiments is that the magnetic metal thin plate is made of an amorphous metal and a silicon steel sheet.

The laminate of magnetic substrates of the present invention can be manufactured such that two or more sheets of the magnetic substrates comprising a high molecular compound layer and a magnetic metal thin plate are stacked and pressure of from 0.2 to 100 MPa is applied thereto such that the metals partially contact one another between the thin plates.

Furthermore, one of the preferred embodiments is that the laminate of magnetic substrates are manufactured by coating not less than 50% of the area of the magnetic metal thin plate with the high molecular compound and then drying, punching the magnetic metal thin plates obtained, stacking them and subjecting them to plastic deformation according to caulking or the like, and heating the resulting magnetic metal thin plates while applying pressure of from 0.2 to 100 MPa for an integrated lamination.

The laminate of magnetic substrates of the present invention can be used for any of a transformer, an inductor and an antenna.

Furthermore, the laminate of magnetic substrates of the present invention can be used for a magnetic core material of a stator or a rotor of a motor or a generator.

Effect of the Invention

According to the method of the present invention, by having the volume resistivity in the range of from 0.1 to less than $10^8$ Ωcm, a magnetic laminate has a high stacking factor and high thermal conductivity so that a magnetic core comprising a magnetic laminate in which the temperature elevation is low can be achieved.

BEST MODE FOR CARRYING OUT THE INVENTION

Magnetic Metal Thin Plate

Any known metal magnetic materials can be used for a magnetic metal thin plate used for the present invention. Specific examples thereof include a silicon steel sheet having the content of silicon of from 3 to 6.5% which has come into practical use, permalloy, a nano crystal metal magnetic material, and an amorphous metal magnetic material. In particular, low exothermic and low-loss material is preferable. An amorphous metal magnetic material and a nano crystal metal magnetic material can be appropriately used.

In the present invention, the "magnetic metal thin plate" refers to a magnetic metal material such as a silicon steel sheet or permalloy made into a shape of a thin plate, or sometimes means an amorphous metal ribbon or a nano crystal magnetic metal ribbon. Further, the "magnetic substrate" which can be used for the present invention refers to that laminated with a high molecular compound and the above magnetic metal thin plate.

A silicon steel sheet having the content of silicon of from 3 to 6.5% is used for the "silicon steel sheet" of the present invention. Specific examples of the silicon steel sheet include an oriented electromagnetic steel sheet, a non-oriented electromagnetic steel sheet or the like. A non-oriented electromagnetic steel sheet (Hilitecore, Thin-Gage Hilitecore, High Tension Hilitecore, Homecore, and Semicore) which is currently commercialized by Nippon Steel Corporation or Super-E Core having the content of silicon of 6.5% in Fe—Si which is currently commercialized by JFE Steel Corp. or the like can be preferably used.

(High Molecular Compound)

Any known resin called as such can be used for a high molecular compound which is used for the present invention. In the present invention, a "high molecular compound" may be described as a "resin" or vice versa in some cases. Both indicate the same unless otherwise particularly specified. In particular, when a thermal treatment at equal to or higher than 200° C. is needed for improving the magnetic properties of the metal magnetic material, compounding a heat resistant resin having a low elastic modulus therewith is effective from the viewpoint of exhibition of high performance. Further, a material such as a silicon steel sheet has bigger losses and higher exothermic temperature than those of an amorphous metal magnetic material or a nano crystal metal magnetic material. So, when a material such as the silicon steel sheet and the like is used for power electronics such as motors, transformers or the like, by applying a heat resistant resin, the rated temperature can be improved, which can result in improvement of the rated power or miniaturization of an apparatus. Since the high molecular compound to be used for the present invention is thermally treated at a thermal treatment temperature optimum for enhancing the magnetic properties of an amorphous metal ribbon or a nano crystal metal magnetic ribbon in some cases, it is required to select a material which is less subject to pyrolysis at the above thermal treatment temperature. For example, the thermal treatment temperature of the amorphous metal ribbon depends on composition constituting the amorphous metal ribbon and the magnetic properties to be targeted. Meanwhile, the temperature for enhancing good magnetic properties is approximately in the range of 200 to 700° C. and preferably in the range of 300 to 600° C.

As for the high molecular compound to be used for the present invention, a thermoplastic resin, a non-thermoplastic resin and a thermosetting resin can be cited. Of these, a thermoplastic resin is preferably used.

As the high molecular compound to be used for the present invention, a compound having the amount of weight reduction of normally 1% or less and preferably 0.3% or less is used. The amount of weight reduction is measured using DTA-TG, when a high molecular compound is dried at 120° C. for 4 hours as a pre-treatment and then kept at 300° C. for 2 hours under a nitrogen atmosphere. Specific examples of the resin include a polyimide type resin, a silicon-containing resin, a ketone type resin, a polyamide type resin, a liquid crystal polymer, a nitrile type resin, a thioether type resin, a polyester type resin, an arylate type resin, a sulfone type resin, an imide type resin, and an amide-imide type resin. Of these, use of a polyimide type resin, a sulfone type resin, or an amide-imide type resin is preferable.

Furthermore, when heat resistance of 200° C. or more is not required in the present invention, specific examples of the thermoplastic resin to be used for the present invention include, but are not particularly restricted to, polyether sulfone, polyether imide, polyether ketone, polyethylene terephthalate, nylon, polybutylene terephthalate, polycarbonate, polyphenylene ether, polyphenylene sulfide, polysulfone, polyamide, polyamide-imide, poly lactic acid, polyethylene, polypropylene and the like. Of these, polyether sulfone, polyether imide, polyether ketone polyethylene, polypropylene, epoxy resin, silicon resin, rubber type resin (chloroprene rubber and silicon rubber) and the like can be preferably used.

Further, the thickness of the resin layer of the present invention is preferably in the range of 0.1 μm to 1 mm, more preferably in the range of 1 to 10 μm and further preferably in the range of 2 to 6 μm.

(Volume Resistivity)

In the present invention, as a result of extensive study, when a laminate of magnetic substrates is used for the purpose of a magnetic core or the like, the volume resistivity defined in JIS H 0505 in a direction perpendicular to the adhesive surface of the laminate, that is, in a direction perpendicular to the high molecular compound surface of the laminate of magnetic substrates is proven to be an important correlation factor as a factor determining the thermal conductivity which contributes to improvement of the rated power. Usually, in a laminate of magnetic substrates comprising a magnetic metal thin plate and a high molecular compound, when the magnetic metal thin plate is completely insulated by a high molecular compound that is an insulator, the volume resistivity is $10^8$ Ωcm or more. Further, when insulation is insufficient, the volume resistivity is not more than $10^{-8}$ Ωcm or less. In the present invention, when the volume resistivity is from 0.1 to less than $10^8$ Ωcm and preferably from 1 to $10^8$ Ωcm, the thermal conductivity become high; therefore such volume resistivity is preferable. Although the present inventors do not stick to any specific theory, they consider that such a change in the volume resistivity is caused by creation of the electrical continuity point because fine convex and concave on the metal thin plate slightly contact one other.

The electrical continuity point is considered to be created as fine convex and concave on the magnetic metal thin plate slightly contact each other. An integrated lamination process and electrical continuity process are carried out by keeping pressure in a state that a resin is flowing and integrating magnetic metal thin plates. The optimum conditions of pressure to be applied depend on the surface roughness of the magnetic metal thin plate, the type of the resin in use or a thickness of the resin. Usually, pressure is from 0.2 to 100 MPa and preferably from 1 to 100 MPa.

For example, when a thermoplastic resin is used, it is preferable to keep a pressurized state while keeping a flowing state in the course of cooling after heating. For example, when a thermosetting resin is used, it is preferable to pressurize until a desired heat curing is terminated. Metal thin plates effectively contact one another by pressurizing, thus resulting in effectively reducing the volume resistivity. In particular, when the volume resistivity of the thermoplastic resin is reduced, at a temperature region of not less than the glass transition temperature of the thermoplastic resin, pressure is usually from 0.2 to 100 MPa and preferably from 2 to 30 MPa. By applying pressure in such a range, a resin is effectively pushed out between metal thin plates so that metal thin plates can contact each other. Furthermore, to achieve the electrical continuity between metal thin plates, it is possible to achieve the electrical continuity using cure shrinkage or surface tension of resins. The thus-obtained laminate of magnetic metals has the volume resistivity of the present invention.

(Method of Coating)

A method of coating which is used for the present invention is not particularly restricted and any known methods can be used. More specifically, a known coating apparatus such as a roll coater, a gravure coater or the like is used to an original plate of a magnetic metal thin plate to form a coated film on the thin plate by a resin varnish in which a resin is dissolved in an organic solvent. The resulting material is dried to give a high molecular compound to the amorphous metal thin plate. In this manner, a magnetic substrate can be manufactured. Usually, the coating thickness is adjusted by the surface roughness of the magnetic metal thin plate in use. In order to achieve the volume resistivity of the present invention as described above, it is required that magnetic metal thin plates partially contact one another; however, since the magnetic metal thin plate is preferably coated with the high molecular compound as much as possible from the viewpoint of the strength of the magnetic substrate, coating must be made such that the area of the magnetic metal thin plate of at least not less than 50%, preferably not less than 90%, and more preferably not less than 95% is covered with the high molecular compound.

Furthermore, the coated film thickness of a varnish for coating depends on the surface roughness of the magnetic metal thin plate in use. Usually, it is from about 0.1 μm to 1 mm. In order to reduce the core loss, coated film thickness of the varnish is as thin as possible, which is preferably from about 0.1 to 10 μm because the core loss can be reduced when the stacking factor is high. Further, the viscosity of the resin varnish may be preferably in the range of 0.005 to 200 Pa·s, more preferably in the range of 0.01 to 50 Pa·s and further preferably in the range of 0.05 to 5 Pa·s. The resin varnish mentioned herein refers to a liquid in a state that a resin or a precursor of the resin is dispersed or dissolved in an organic solvent.

(Punching Process and Caulking Process)

The magnetic metal thin plates coated with the resin, i.e., the magnetic substrates of the present invention are punched and stacked in a desired number thereof and joined one another by the plastic deformation to enable the formation of a laminate. Caulking can be used as a method of joining by the plastic deformation. This process is carried out by cutting a magnetic metal thin plate into a desired shape according to a press-punch process that is a known shape processing technique, subsequently, according to a known caulking process comprising crushing a part of the material and joining two or more of metal thin plates, by joining a plurality of magnetic metal thin plates together to form a laminate. As a caulking process, a dowel caulking step is preferably used. However, when a magnetic metal thin plate material to be punched is as thin as from several tens of micrometers to several hundreds of micrometers, it is difficult to have sufficient joint strength only with a caulking processing. Thus, a resin is adhered according to a heating step for integration while applying pressure in the present invention.

(Integrated Lamination)

In the present invention, the "integrated lamination" means that after the desired number of laminates of magnetic substrates comprising a high molecular compound layer and a magnetic metal thin plate are stacked, high molecular compounds fusion bond with one another for combining respective magnetic substrates by heating the stacked laminates while applying pressure.

To manufacture a laminate of magnetic substrates provided with a high molecular compound to a metal magnetic thin plate, an integrated lamination can be carried out, for example, by using a heat press, a hot roll or the like. The temperature at pressurizing is different depending on the type of the high molecular compound. However, an integrated lamination is preferably carried out at around a temperature that softens or melts at a temperature of equal to or higher than the glass transition temperature of the high molecular compound to be used for the present invention. The top of the magnetic metal thin plate is coated with the high molecular compound and then the solvent is removed. Then, a plurality of magnetic metal thin plates is laminated for an integrated lamination and a step of creating the electrical continuity point is carried out at the same time.

(Method of Thermal Treatment)

The magnetic metal thin plate of the present invention is preferably subjected to a thermal treatment when magnetic properties such as the core loss, magnetic permeability or the like can be improved by the thermal treatment of the magnetic metal thin plate. At this time, it is important to conduct the thermal treatment of the high molecular compound for coating to the extent that the adhesive force between metals is not lost by the thermal treatment. As the magnetic metal thin plate showing considerable improvement of the magnetic properties by the thermal treatment, an amorphous magnetic metal ribbon, a nano crystal metal magnetic ribbon material and the like can be cited. The thermal treatment temperature for improving the magnetic properties is approximately from 300 to 700° C. and preferably from 350 to 600° C. usually in an inert gas atmosphere or in vacuum, or according to purposes, in a magnetic field.

EXAMPLES

The stacking factor was calculated by the following equation.

Stacking factor (%)=(amorphous metal ribbon thickness×number of laminates)/(thickness of laminates after lamination)×100

The volume resistivity was derived in accordance with JIS H 0505.

The thermal conductivity was obtained in accordance with JS R 1611.

Example 1

As a magnetic metal thin plate, an amorphous metal ribbon, Metglas: 2605TCA (a trade name) of about 142-mm wide and about 25-μm thick manufactured by Honeywell International Inc. and having the nominal composition of $Fe_{78}B_{13}Si_9$ (atomic %) was used. The whole surface of one side of the ribbon was coated using a roll coater with a polyamide acid solution having the viscosity of about 0.3 Pa·s at 25° C. when measured using the E type viscometer, dried at 140° C. and then cured at 260° C. to give a heat resistant resin (a polyimide resin) of about 4 micron on one side of the amorphous metal ribbon. The polyimide resin was obtained by mixing 3,3'-diaminodiphenyl ether with 3,3',4,4'-biphenyltetracarboxylic acid dianhydride at a ratio of 1:0.98 and performing the polycondensation in a dimethyl acetamide solvent at a room temperature. Usually, a diacetylamide solution was used as the polyamide acid.

Furthermore, magnetic substrates obtained by coating with the resin were cut at 50 square-mm and 50 sheets thereof were stacked. Then, the stacked substrates were pressurized at 10 MPa and 270° C. under a nitrogen atmosphere for 30 minutes for an integrated lamination, and subjected to a thermal treatment at 1 MPa and 370° C. for 2 hours. Then, the stacking factor and the volume resistivity defined in JIS H 0505 were measured for evaluation. Further, the thermal conductivity defined in JIS R 1611 was measured.

Incidentally, the volume resistivity of the present invention was derived in accordance with JIS H 0505. A sample shape for measuring the volume resistivity was a rectangular parallelepiped of 40×40×0.7 mm. HP4284A manufactured by Hewlett-Packard Development Company, L.P. was used for measuring the resistivity. The top and bottom of the sample came into contact with probes to measure the direct current resistance value and the resistivity was derived from the resistance value measured and the sample shape using the average cross-section area method in JIS H 0505.

The temperature elevation was measured by applying the alternating magnetic field. That is, the magnetic substrates of this example were punched by a mould in a toroidal shape of outer diameter 40 mm and inner diameter 25 mm, and 50 sheets thereof were stacked. Then, the stacked toroidals were pressurized at 10 MPa and 270° C. under a nitrogen atmosphere for 30 minutes using a thermal press for an integrated lamination, and further subjected to a thermal treatment at 1 MPa and 370° C. for 2 hours. The coated copper wire was provided with 25 turns for the primary coil and 25 turns for the secondary coil. The current of 1 kHz was applied to the primary coil using an alternating current amplifier so as to apply the alternating magnetic field of 1 T. The temperature elevation (a difference between the surface temperature and room temperature) was measured by using a K type thermocouple.

The results are shown in Table 1.

Example 2

As a magnetic metal thin plate, an amorphous metal ribbon, Metglas: 2714A (a trade name) of about 50-mm wide and about 15-μm thick manufactured by Honeywell International Inc. and having the nominal composition of $Co_{66}Fe_4Ni_1(BSi)_{29}$ (atomic %) was used. The whole surface of one side of the ribbon was coated using a roll coater with a polyamide acid solution having the viscosity of about 0.3 Pa·s at 25° C. when measured using the E type viscometer, dried at 140° C. and then cured at 260° C. to give a heat resistant resin (a polyimide resin) of about 4 micron on one side of the amorphous metal ribbon. The polyimide resin was obtained by mixing 3,3'-diaminodiphenyl ether with 3,3',4,4'-biphenyltetracarboxylic acid dianhydride at a ratio of 1:0.98 and performing the polycondensation in a dimethyl acetamide solvent at a room temperature. Usually, a diacetylamide solution was used as the polyamide acid.

Furthermore, magnetic substrates obtained by coating with the resin were cut at 30 square-mm and 50 sheets thereof were stacked. Then, the stacked substrates were pressurized for 30 minutes at 10 MPa and 270° C. under a nitrogen atmosphere for an integrated lamination, and subjected to a thermal treatment at 1 MPa and 400° C. for 2 hours. Then, the stacking factor and the volume resistivity defined in JIS H 0505 were measured for evaluation. Further, the thermal conductivity defined in JIS R 1611 was measured.

In order to measure the temperature elevation when the alternating magnetic field was applied, the magnetic substrates of this example were punched by a mould in a toroidal shape of outer diameter 40 mm and inner diameter 25 mm, and 50 sheets of these toroidals were stacked. Then, the stacked toroidals were pressurized at 10 MPa and 270° C. under a nitrogen atmosphere for 30 minutes using a thermal press for an integrated lamination, and further subjected to a thermal treatment at 1 MPa and 400° C. for 2 hours. The coated copper wire was provided with 25 turns for the primary coil and 25 turns for the secondary coil. The current of 1 kHz was applied using an alternating current amplifier so as to apply the alternating magnetic field of 0.3 T. The temperature elevation (a difference between the surface temperature and room temperature) was measured by using a K type thermocouple.

The results are shown in Table 1.

Example 3

As a magnetic metal thin plate, a nano crystal magnetic metal ribbon, Finemet (a trade name), FT-3 of about 35-mm wide and about 18-μm thick manufactured by Hitachi Metals, Ltd. and having the elemental composition of Fe, Cu, Nb, Si and B was used. Magnetic substrates were coated with a resin in the same manner as in Example 1. The magnetic substrates were cut at 30 square-mm and 50 sheets thereof were stacked. Then, the stacked substrates were pressurized for 30 minutes at 10 MPa and 270° C. under a nitrogen atmosphere for an integrated lamination, and subjected to a thermal treatment at 1 MPa and 550° C. for 1.5 hours. Then, the stacking factor and the volume resistivity defined in JIS H 0505 were measured for evaluation. Further, the thermal conductivity defined in JIS R 1611 was measured.

In order to measure the temperature elevation when the alternating magnetic field was applied, the magnetic substrates of this example were punched by a mould in a toroidal shape of outer diameter 40 mm and inner diameter 25 mm, and 50 sheets of these toroidals were stacked. Then, the stacked toroidals were pressurized for 30 minutes at 10 MPa and 270° C. under a nitrogen atmosphere using a thermal press for an integrated lamination, and further subjected to a thermal treatment at 1 MPa and 550° C. for 2 hours. The coated copper wire was provided with 25 turns for the primary coil and 25 turns for the secondary coil. The current of 1 kHz was applied using an alternating current amplifier so as to apply the alternating magnetic field of 0.3 T. The temperature elevation (a difference between the surface temperature and room temperature) was measured by using a thermocouple.

The results are shown in Table 1.

Example 4

As a magnetic metal thin plate, a silicon steel sheet, Thin-Gage Hilitecore (a trade name), 20HTH1500 of about 150-mm wide and about 200-μm thick manufactured by Nippon Steel Corp. was used. Magnetic substrates were coated with a resin in the same manner as in Example 1. The magnetic substrates were cut at 30 square-mm and 5 sheets thereof were stacked. Then, the stacked substrates were pressurized for 30 minutes at 10 MPa and 270° C. under a nitrogen atmosphere for an integrated lamination. Then, the stacking factor and the volume resistivity defined in JIS H 0505 were measured for evaluation. Further, the thermal conductivity defined in JIS R 1611 was measured.

In order to measure the temperature elevation when the alternating magnetic field was applied, the magnetic substrates of this example were punched by a mould in a toroidal shape of outer diameter 40 mm and inner diameter 25 mm, and 5 sheets of these toroidals were stacked. Then, the stacked toroidals were pressurized for 30 minutes at 10 MPa and 270° C. under a nitrogen atmosphere using a thermal press for an integrated lamination. The coated copper wire was provided with 25 turns for the primary coil and 25 turns for the secondary coil. The current of 1 kHz was applied using an alternating current amplifier so as to apply the alternating magnetic field of 0.3 T. The temperature elevation (a difference between the surface temperature and room temperature) was measured by using a thermocouple.

The results are shown in Table 1.

Example 5

As a magnetic metal thin plate, an amorphous metal ribbon, Metglas: 2605TCA (a trade name) of about 142-mm wide and about 25-μm thick manufactured by Honeywell International Inc. and having the nominal composition of $Fe_{78}B_{13}Si_9$ (atomic %) was used. 90 parts of YDB-530 (Tohto Kasei Co., Ltd.) and 10 parts of YDCN-704 (Tohto Kasei Co., Ltd.) as an epoxy resin, 3 parts of dicyandiamide as a curing agent, 0.1 part of imidazole 2E4MZ as a curing accelerator and 30 parts of methyl cellosolve solvent were mixed and methyl ethyl ketone was added thereto in a proper amount to prepare a varnish of 50% solid content. Magnetic metal ribbons were coated with this varnish and magnetic substrates half-cured at 150° C. for 20 seconds were manufactured. A resin was prepared such that the thickness was 4 μm after curing. Magnetic substrates obtained by providing a resin in a half-cured state were cut at 50 square-mm, and 50 sheets thereof were stacked. Then, the stacked substrates were pressurized for 30 minutes at 10 MPa and 270° C. under a nitrogen atmosphere for an integrated lamination, and subjected to a curing treatment at 10 MPa and 150° C. for 2 hours. Then, the stacking factor and the volume resistivity defined in JIS H 0505 were measured for evaluation. Further, the thermal conductivity defined in JIS R 1611 was measured.

In order to measure the temperature elevation when the alternating magnetic field was applied, materials having the metal ribbon coated with the resin which was half-cured in the same manner as the laminated plate were punched using a mould in a toroidal shape of outer diameter 40 mm and inner diameter 25 mm, and 50 sheets of these toroidals were stacked. Then, the stacked toroidals were pressurized at 10 MPa and 150° C. using a thermal press for an integrated lamination. The coated copper wire was provided with 25 turns for the primary coil and 25 turns for the secondary coil. The current of 1 kHz was applied to the primary coil using an alternating current amplifier so as to apply the alternating magnetic field of 1 T. The temperature elevation (a difference between the surface temperature and room temperature) was measured by using a K type thermocouple.

The results are shown in Table 1.

Example 6

As a magnetic metal thin plate, a silicon steel sheet, Thin-Gage Hilitecore (a trade name), 20HTH1500 of about 150-mm wide and about 200-μm thick manufactured by Nippon Steel Corp. was used. A magnetic substrate was obtained by performing 6 μm coating with a resin in the same manner as in Example 5.

Furthermore, magnetic substrates in which the above resin was half-cured were cut at 30 square-mm and 5 sheets thereof were stacked. Then, the stacked substrates were pressurized for 30 minutes at 10 MPa and 150° C. for an integrated lamination. Then, the stacking factor and the volume resistivity defined in JIS H 0505 were measured for evaluation. Further, the thermal conductivity defined in JIS R 1611 was measured.

In order to measure the temperature elevation when the alternating magnetic field was applied, the magnetic substrates of this example were punched using a mould in a toroidal shape of outer diameter 40 mm and inner diameter 25 mm, and 5 sheets of these toroidals were stacked. Then, the stacked toroidals were pressurized for 30 minutes at 10 MPa and 150° C. using a thermal press for an integrated lamination. The coated copper wire was provided with 25 turns for the primary coil and 25 turns for the secondary coil. The current of 1 kHz was applied using an alternating current amplifier so as to apply the alternating magnetic field of 0.3 T. The temperature elevation (a difference between the surface temperature and room temperature) was measured by using a thermocouple.

The results are shown in Table 1.

Example 7

As a magnetic metal thin plate, Metglas: 2605TCA (a trade name) of about 142-mm wide and about 25-μm thick manufactured by Honeywell International Inc. in Example 1 was used. Magnetic materials were obtained by giving a heat resistant resin (a polyimide resin) of 4 micron in the same manner as in Example 1.

Furthermore, magnetic substrates were cut at 50 square-mm and 50 sheets thereof were stacked. Then, the stacked substrates were pressurized for 30 minutes at 10 MPa and 270° C. under a nitrogen atmosphere for an integrated lamination, and subjected to a thermal treatment at 15 MPa and 370° C. for 2 hours. Then, the stacking factor and the volume resistivity defined in JIS H 0505 were measured for evaluation. Further, the thermal conductivity defined in JIS R 1611 was measured.

In order to measure the temperature elevation when the alternating magnetic field was applied, the magnetic substrates of this example were punched using a mould in a toroidal shape of outer diameter 40 mm and inner diameter 25 mm, and 50 sheets of these toroidals were stacked. Then, the stacked toroidals were pressurized for 30 minutes at 10 MPa and 270° C. under a nitrogen atmosphere using a thermal press for an integrated lamination, and further subjected to a thermal treatment at 15 MPa and 370° C. for 2 hours. The temperature elevation was measured in the same manner as in Example 1.

The results are shown in Table 1.

Example 8

As a magnetic metal thin plate, Metglas: 2605TCA (a trade name) of about 142-mm wide and about 25-μm thick manufactured by Honeywell International Inc. in Example 1 was used. Magnetic materials were obtained by giving a heat resistant resin (a polyimide resin) of 6 micron in the same manner as in Example 1.

Furthermore, magnetic substrates were cut at 50 square-mm and 50 sheets thereof were stacked. Then, the stacked substrates were pressurized for 30 minutes at 10 MPa and 270° C. under a nitrogen atmosphere for an integrated lamination, and subjected to a thermal treatment at 100 MPa and 450° C. for 2 hours. Then, the stacking factor and the volume resistivity defined in JIS H 0505 were measured for evaluation. Further, the thermal conductivity defined in JIS R 1611 was measured.

In order to measure the temperature elevation when the alternating magnetic field was applied, the magnetic substrates of this example were punched using a mould in a toroidal shape of outer diameter 40 mm and inner diameter 25 mm, and 50 sheets of these toroidals were stacked. Then, the stacked toroidals were pressurized for 30 minutes at 10 MPa and 270° C. under a nitrogen atmosphere using a thermal press for an integrated lamination, and further subjected to a thermal treatment at 100 MPa and 450° C. for 2 hours. The temperature elevation was measured in the same manner as in Example 1.

The results are shown in Table 1.

Example 9

As a magnetic metal thin plate, an amorphous metal ribbon, Metglas: 2605TCA (a trade name) of about 213-mm wide and about 25-μm thick manufactured by Honeywell International Inc. and having the nominal composition of $Fe_{78}Si_9B_{13}$ (atomic %) was used.

3,3'-diaminodiphenyl ether and 3,3',4,4'-biphenyltetracarboxylic acid dianhydride at a ratio of 1:0.98 were polycondensed in a dimethyl acetamide solvent at a room temperature to obtain a polyamide acid solution (the viscosity of 0.3 MPa, a room temperature, and an E type viscometer used). One side each of the ribbon and silicon steel sheet (Thin-Gage Hilitecore, 20HTH1500 of 200-mm wide and 200-μm thick, manufactured by Nippon Steel Corp.) was provided with this polyamide acid solution, dried at 140° C. and polyimidized at 260° C., while one side of the amorphous metal ribbon was provided with a heat resistant resin (a polyimide resin) of about 4 μm thick. In this manner, a magnetic substrate was formed.

Subsequently, these magnetic substrates were cut at 50 square-mm and 10 sheets thereof were alternately stacked. The stacked substrates were pressurized for 30 minutes at 5 MPa and 260° C. in the atmosphere using a hot roll and a pressure roll to manufacture a laminate and, in order to exhibit the magnetic properties, further subjected to a thermal treatment at 370° C. (1 MPa) for 2 hours under a nitrogen atmosphere in a conveyor furnace to form a magnetic substrate. Then, the stacking factor and the volume resistivity defined in JIS H 0505 were measured for evaluation. Further, the thermal conductivity defined in JIS R 1611 was measured.

The results are shown in Table 1.

Example 10

As a magnetic metal thin plate, an amorphous metal ribbon (Metglas (registered trademark) 2605TCA of about 213-mm wide and about 25-μm thick manufactured by Honeywell International Inc. and having the nominal composition of $Fe_{78}Si_9B_{13}$ (atomic %)) was used. The whole surfaces of both sides of the ribbon were provided with a polyamide acid solution having the viscosity of about 0.3 Pa·s to volatilize the solvent at 150° C. and then made into a polyimide resin at 250° C. to manufacture an amorphous metal ribbon provided with a high molecular compound (a polyimide resin) of about 4 micron on one side of the magnetic metal thin plate. As the high molecular compound, a polyamide acid, i.e., a precursor of the polyimide obtained by 3,3'-diaminodiphenyl ether as diamine and bis(3,4-dicarboxyphenyl) ether dianhydride as tetracarboxylic acid dianhydride was used. The thus-obtained polyamide acid was dissolved in a dimethyl acetamide solvent, with which the top of the amorphous metal ribbon was coated. The top of this amorphous metal ribbon was heated at 250° C. to form a polyimide resin. In this way, a magnetic substrate was obtained.

These magnetic substrates were punched in a strip shape and the strips were stacked to manufacture a laminate by caulking. Furthermore, the laminate was further heated for 30 minutes at 5 MPa and 270° C. for melting a polyimide resin layer of the amorphous metal ribbon and metal ribbons were adhered to each other for an integrated lamination. The stacking factor of this laminate was 90%. Further, the laminate was further subjected to a thermal treatment at 1 MPa and 370° C. for 2 hours.

The results are shown in Table 1.

Comparative Example 1

As a magnetic metal thin plate, an amorphous metal ribbon, Metglas: 2605TCA (a trade name) of about 142-mm wide and about 25-μm thick manufactured by Honeywell International Inc. and having the nominal composition of $Fe_{78}B_{13}Si_9$ (atomic %) was used. The whole surface of one side of the ribbon was coated using a roll coater with a polyamide acid solution having the viscosity of about 0.3 Pa·s at 25° C. when measured using the E type viscometer, dried at 140° C. and then cured at 260° C. to provide a heat resistant resin (a polyimide resin) of about 6 micron on one side of the amorphous metal ribbon. The polyimide resin was obtained by mixing 3,3'-diaminodiphenyl ether with 3,3',4,4'-biphenyltetracarboxylic acid dianhydride at a ratio of 1:0.98 and performing the polycondensation in a dimethyl acetamide solvent at a room temperature. Usually, a diacetylamide solution was used as the polyamide acid.

Furthermore, magnetic substrates obtained by coating with the resin were cut at 50 square-mm and 50 sheets thereof were stacked. Then, the treatment was carried out in the same manner as in Example 1, except that the stacked substrates were subjected to a thermal treatment at 0.05 MPa and 370° C. under a nitrogen atmosphere for 2 hours. Then, the stacking factor and the volume resistivity defined in JIS H 0505 were measured for evaluation. Further, the thermal conductivity defined in JIS R 1611 was measured.

In order to measure the temperature elevation when the alternating magnetic field was applied, materials having the metal ribbon coated with the resin in the same manner as the laminated plate were punched using a mould in a toroidal shape of outer diameter 40 mm and inner diameter 25 mm, and 50 sheets of these toroidals were stacked. Then, the stacked toroidals were pressurized for 30 minutes at 10 MPa and 270° C. under a nitrogen atmosphere using a thermal press for an integrated lamination, and further subjected to a thermal treatment at 0.05 MPa and 370° C. for 2 hours. The coated copper wire was provided with 25 turns for the primary coil and 25 turns for the secondary coil. The current of 1 kHz was applied using an alternating current amplifier so as to apply the alternating magnetic field of IT. The temperature elevation (a difference between the surface temperature and room temperature) was measured by using a thermocouple.

The results are shown in Table 1.

Comparative Example 2

As a magnetic metal thin plate, Metglas: 2605TCA (a trade name) of about 142-mm wide and about 25-μm thick manufactured by Honeywell International Inc. in Example was used to provide a heat resistant resin (a polyimide resin) of 4 micron in the same manner as in Example 1.

Furthermore, magnetic substrates obtained by coating with the resin were cut at 50 square-mm and 50 sheets thereof were stacked. Then, the stacked substrates were pressurized for 30 minutes at 10 MPa and 270° C. under a nitrogen atmosphere for an integrated lamination, and subjected to a thermal treatment at 800 MPa and 450° C. for 2 hours. Then, the stacking factor and the volume resistivity defined in JIS H 0505 were measured for evaluation. Further, the thermal conductivity defined in JIS R 1611 was measured.

In order to measure the temperature elevation when the alternating magnetic field was applied, materials having the metal ribbon coated with the resin in the same manner as the laminated plate were punched using a mould in a toroidal shape of outer diameter 40 mm and inner diameter 25 mm, and 50 sheets of these toroidals were stacked. Then, the stacked toroidals were pressurized for 30 minutes at 10 MPa and 270° C. under a nitrogen atmosphere using a thermal press for an integrated lamination, and further subjected to a thermal treatment at 800 MPa and 450° C. for 2 hours.

The temperature elevation was measured in the same manner as in Example 1.

The above results are listed in the following table.

TABLE 1

| | Volume Resistivity Ωcm | Stacking Factor % | Thermal Conductivity W/mk | Temperature Elevation ° C. |
|---|---|---|---|---|
| Example 1 | $1.2 \times 10^2$ | 87 | 3 | 15 |
| Example 2 | $9 \times 10^2$ | 80 | 3 | 5 |
| Example 3 | $5 \times 10^2$ | 91 | 2.8 | 8 |
| Example 4 | $6 \times 10^2$ | 95 | 2.4 | 20 |
| Example 5 | $1.5 \times 10^2$ | 87 | 2.9 | 18 |
| Example 6 | $6.7 \times 10^2$ | 95 | 2.5 | 20 |
| Example 7 | $1.1 \times 10^2$ | 88 | 3.1 | 17 |
| Example 8 | $0.8 \times 10^2$ | 91 | 3.3 | 23 |
| Comparative Example 1 | $1.2 \times 10^8$ | 78 | 0.12 | 35 |
| Comparative Example 2 | 0.05 | 93 | 3.5 | 30 |

From the table, the magnetic metal laminate of the present invention has been proven to have high thermal conductivity and high heat releasing properties by having the volume resistivity of the present invention for suppressing the temperature elevation, and found to have a remarkable effect in a miniaturization and high performance of a magnetic core accordingly.

INDUSTRIAL APPLICABILITY

The present invention can be applied to many purposes in which soft magnetic materials are used. For example, it can be used as a material which supports various functions of electronic instruments or electronic parts such as inductances, choke coils, high frequency transformers, low frequency transformers, reactors, pulse transformers, step-up transformers, noise filters, voltage inverter transformers, magnetic impedance elements, magnetostriction oscillators, magnetic sensors, magnetic heads, electromagnetic shields, shield connectors, shield packages, radio wave absorbents, motors, cores for generators, cores for antennas, magnetic disks, magnetism-applied carrier systems, magnets, electromagnetic solenoids, cores for actuators, printed circuit boards, magnetic cores or the like.

The invention claimed is:

1. A laminate comprising two or more magnetic metal thin plates, each magnetic metal thin plate being selected from the group consisting of an amorphous metal plate and a nano crystal magnetic plate and coated with a high molecular compound, wherein the two or more magnetic metal thin plates are partially in contact with one another by applying pressure so that the high molecular compound that is positioned between the two or more magnetic metal thin plates is pushed out, and wherein the volume resistivity defined in JIS H 0505 in a direction perpendicular to the high molecular compound surface of the magnetic metal thin plates is from 0.1 Ωcm to less than $10^8$ Ωcm.

2. The laminate according to claim 1, wherein the high molecular compound layer covers not less than 50% of the area of the two or more magnetic metal thin plates, and the volume resistivity defined in JIS H 0505 in a direction perpendicular to the high molecular compound surface of the two or more magnetic metal thin plates is from 1 Ωcm to less than $10^6$ Ωcm.

3. The laminate according to claim 1, wherein two or more kinds of magnetic metal thin plates are used as the two or more magnetic metal thin plates.

4. A method of manufacturing the laminate according to claim 1, comprising:

stacking two or more magnetic metal thin plates coated with a high molecular compound; and applying pressure of from 0.2 to 100 MPa to the two or more magnetic metal thin plates such that the two or more magnetic thin plates are partially in contact with one another via the high molecular compound.

5. A method of manufacturing the laminate according to claim 1, comprising:

coating not less than 50% of the area of the two or more magnetic metal thin plates with a high molecular compound and drying punching the two or more magnetic metal thin plates obtained;

stacking them and subjecting them to plastic deformation; and heating the resulting two or more magnetic metal thin plates while applying pressure of from 0.2 to 100 MPa thereto to form an integrated laminate.

6. The method according to claim 5, wherein the method of subjecting to plastic deformation is a caulking process.

7. The laminate according to claim 3, wherein the laminate is used for any of a transformer, an inductor and an antenna.

8. The laminate according to claim 3, wherein the laminate is used for a magnetic core material of a stator or a rotor of a motor or a generator.

9. The laminate according to claim 1, wherein the laminate is used for any of a transformer, an inductor and an antenna.

10. The laminate according to claim 1, wherein the laminate is used for a magnetic core material of a stator or a rotor of a motor or a generator.

11. The laminate according to claim 1, wherein the high molecular compound is selected from the group consisting of a polyimide resin, a silicon-containing resin, a ketone resin, a polyamide resin, a liquid crystal polymer, a nitrile resin, a thioether resin, a polyester resin, an arylate resin, a sulfone resin, an imide resin, and an amide-imide resin.

12. The laminate according to claim 1, wherein the high molecular compound is selected from the group consisting of a polyimide resin, a sulfone resin, and an amide-imide resin.

13. A laminate comprising two or more magnetic metal thin plates, each magnetic metal thin plate being selected from the group consisting of a nano crystal magnetic plate and a silicon steel sheet and coated with a high molecular compound, wherein the two or more magnetic metal thin plates are partially in contact with one another by applying pressure so that the high molecular compound that is positioned between the two or more magnetic metal thin plates is pushed out, and wherein the volume resistivity defined in JIS H 0505 in a direction perpendicular to the high molecular compound surface of the magnetic metal thin plates is from 0.1 Ωcm to less than $10^8$ Ωcm.

14. The laminate according to claim 13, wherein the high molecular compound layer covers not less than 50% of the area of the two or more magnetic metal thin plates, and the volume resistivity defined in JIS H 0505 in a direction perpendicular to the high molecular compound surface of the two or more magnetic metal thin plates is from 1 Ωcm to less than $10^6$ Ωcm.

15. The laminate according to claim 1, wherein the number of magnetic metal thin plates is five or more.

16. The laminate according to claim 13, wherein the number of magnetic metal thin plates is five or more.

17. The laminate according to claim 1, wherein the high molecular compound comprises a thermoplastic resin.

18. The laminate according to claim 13, wherein the high molecular compound comprises a thermoplastic resin.

* * * * *